Nov. 23, 1948.  W. M. LESTER  2,454,561
MOLDING MACHINE

Filed Feb. 21, 1945  2 Sheets-Sheet 1

INVENTOR
William M. Lester
BY
George T. Gill
ATTORNEY

Nov. 23, 1948.　　　W. M. LESTER　　　2,454,561
MOLDING MACHINE
Filed Feb. 21, 1945　　　　　　　　　2 Sheets-Sheet 2

INVENTOR
William M. Lester
BY
George T. Gell
ATTORNEY

Patented Nov. 23, 1948

2,454,561

UNITED STATES PATENT OFFICE 2,454,561

MOLDING MACHINE

William M. Lester, Mountainside, N. J.

Application February 21, 1945, Serial No. 579,041

2 Claims. (Cl. 18—30)

The invention herein disclosed relates to an injection molding machine. More particularly, the invention relates to an injection molding machine that is especially suitable for molding articles with a screw thread.

An object of the invention is to provide a machine of the kind mentioned in which the thread-forming element is unscrewed upon the opening of the dies. Another object of the invention is to provide such a machine in which the molded article is withdrawn from the mold cavity upon the opening of the dies. A further object of the invention is to provide a machine of this kind that is especially suitable for molding internally threaded caps.

The foregoing objects and certain advantages that will hereinafter appear are realized in the embodiment of the invention illustrated in the accompanying drawing and described in detail below, from which description a clearer understanding of the invention may be had.

Figure 1:
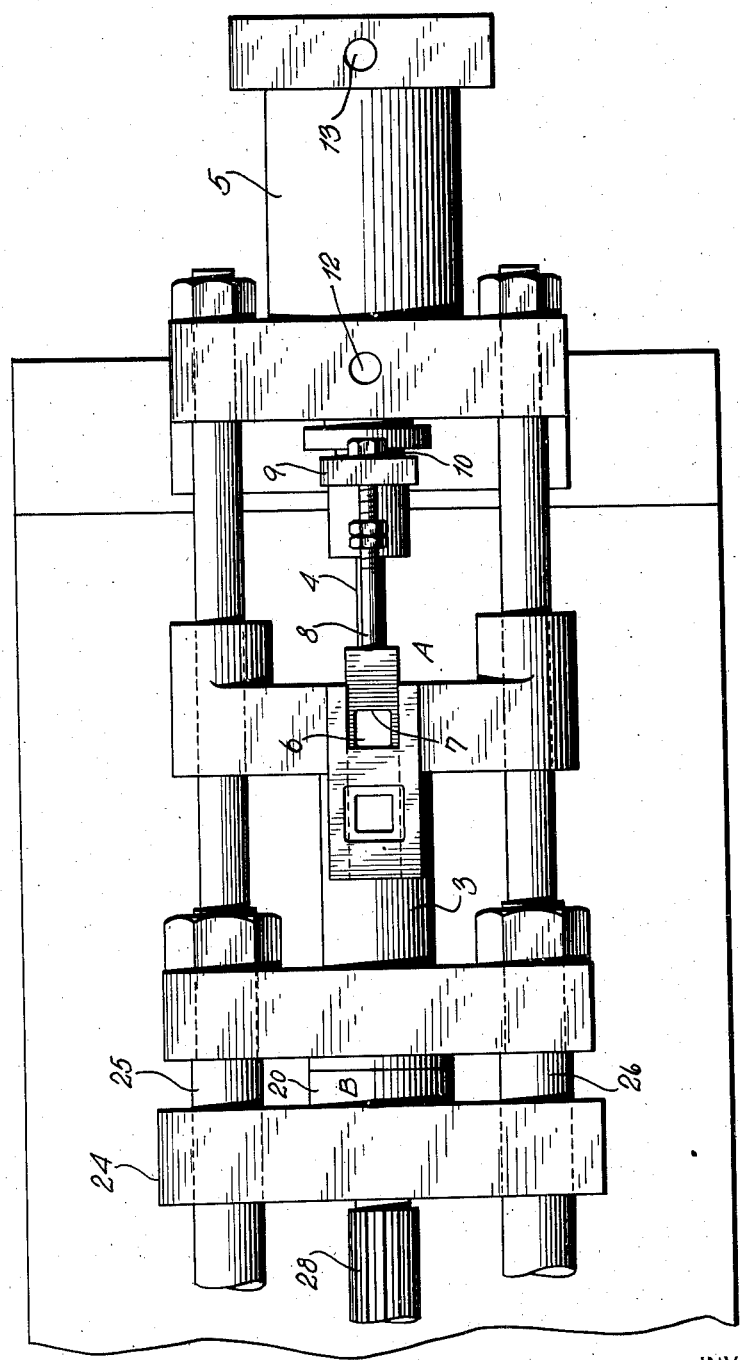
Figure 2:
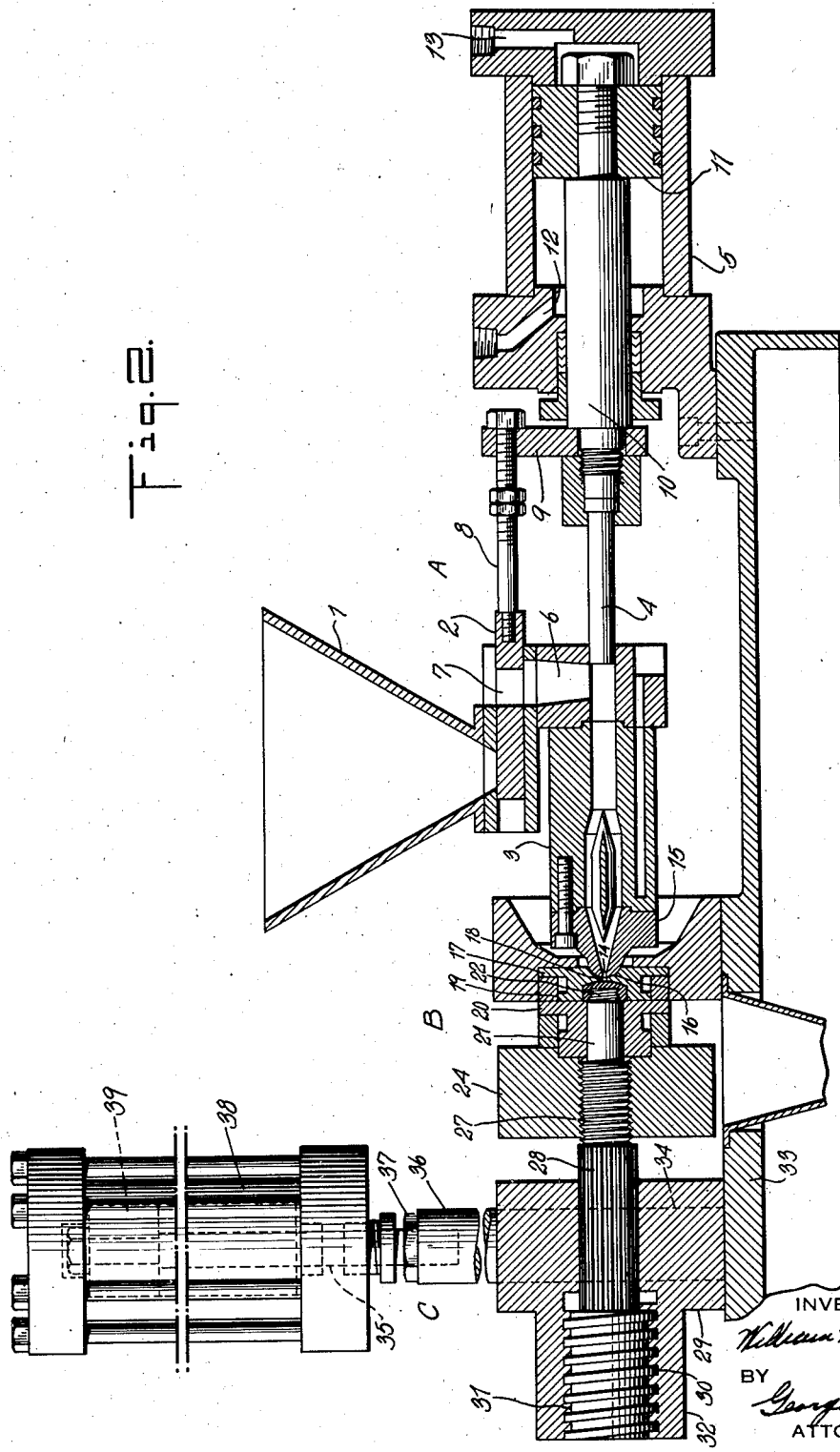

The drawings include:

Fig. 1 which is a partial plan of an injection molding machine constituting one embodiment of the invention; and Fig. 2 which is a sectional elevation of the same taken on the line 2—2 of Fig. 1.

In general, the machine illustrated in the drawings includes injecting mechanism, designated generally by the character A, relatively movable molds or dies, designated generally by the character B, and mechanism, designated generally by the character C for effecting relative movement of the dies. Thermo-plastic material in suitable physical condition is delivered to the injection mechanism A wherein it is heated to attain a plastic condition. The plastic material is forced, under pressure, into the mold cavity in the dies B wherein it is molded to the desired form. The mechanism C operates to separate the dies, withdraw the molded article from the mold cavity and release the article from the core.

The injection mechanism A for injecting the thermo-plastic material into the mold includes a hopper 1 that contains a quantity of the material in suitable physical condition for plasticizing, a measuring valve or plunger 2, a suitably heated injection cylinder 3, an injection plunger 4, and an air cylinder 5 for actuating the plunger 4 and the measuring valve 2. The lower end of the hopper opens to the case of the measuring valve at a point spaced from a passage 6 opening into the injection cylinder 3. In the position shown, the plunger 4 is withdrawn and the valve 2 has an opening 7 therethrough in line with the passage 6. When the plunger 4 is moved to its forward position, the valve 2 moves with it as it is secured to the plunger through a valve stem 8 and a bracket 9. At the forward end of the movement, the opening 7 of the measuring valve is below the open end of the hopper. In this position, a quantity of the material, sufficient to fill the opening 7 is discharged from the hopper. Upon the return movement of the plunger and valve, the material in the opening 7 falls through the passage 6 into the cylinder 3. In this way, measured quantities of the material are delivered to the injection cylinder and forced through the cylinder, which is properly heated to plasticize the material, by the plunger 4.

The valve and plunger are desirably pneumatically operated. To this end the plunger 4 is secured to the end of a piston rod 10 which extends into the cylinder 5. Within the cylinder, there is a piston 11 to which the piston rod is secured. Suitable ports 12 and 13 are provided in the opposite ends of the cylinder for the admission and exhaust of air under pressure. A four way valve (not shown), manually or mechanically actuated, may be used for controlling the flow of air under pressure to the cylinder 5.

By the forward movement of the plunger 4, the material, in a plastic state, is forced through an opening 14 in an injection head 15. This head has a spherical-sector, end portion 16 that is received in a complementary depression in a stationary die plate 17 which constitutes one part of the mold B. A sprue opening 18, through the stationary die plate 17, connects with the opening 14 and a mold cavity 19 in the stationary die plate. In this way, the plastic material is forced, under pressure, into the mold cavity. The particular mold cavity shown is for a screw cap having an internal thread and the sprue opening is desirably of very small diameter.

A movable die 20 cooperates with the stationary die. In the dies illustrated, the movable die has an opening therethrough through which a core rod 21 extends. On the end of the core rod, there is a core 22 having a thread thereon complementary to the internal thread desired in the molded screw cap. In the closed position of the dies, the position shown, in which the movable die is against the stationary die, the core 22 extends into the mold cavity 19 of the stationary die. In the mechanism shown, the mold cavity is entirely within the stationary die. The movable die has a plane surface, except that about the core, the surface of the movable die may desirably be knurled for a purpose that will hereinafter appear.

When the movable die 20 is retracted, the core 22 is simultaneously rotated and withdrawn. The action of the core is such, in relation to the movable die that a molded cap is withdrawn from the mold cavity, the sprue being severed by the withdrawal, so that in the full open position of the movable die, a molded screw cap is completely out of the mold cavity and is released from the core. The molded cap, upon being released, falls into a receiving chute 23 below the dies B. Rotation of the core upon opening of the dies is, of course, for the purpose of unscrewing the threaded core from the molded cap. In this operation, the molded cap is restrained against rotation by virtue of the fact that the relation of the movement of the movable die with respect to the rotation and withdrawal of the core is such that the edge of the molded cap is maintained in frictional engagement with the movable die until the core is completely withdrawn.

The movable die 20 is mounted upon a platten 24 which extends between and is slidably mounted upon spaced, stationary rods 25 and 26. The core rod 21 extends through the platten and has a thread 27 thereon which is in threaded engagement with an internal thread in the opening through the platten. By virtue of this threaded engagement of the core rod 21 and the platten, rotation of the core rod affects the movement of the platten 24 and in consequence the movable die 20.

At the end of the thread 27, there is formed on the core rod 21 a pinion 28 which extends into and is rotatably and slidably mounted in a bracket 29. Beyond the pinion 28, to the left as shown in the drawing, a square thread 30 of larger minor diameter than the major diameter of the pinion is formed on the core rod 21. This thread 30 is in threaded engagement with an internal thread 31 formed on an extension 32 of the bracket 29. The stationary parts of the mechanism above described are mounted upon a stationary frame or table 33.

In engagement with the pinion 28, there is a rack 34. One end of the rack is secured to the end of a piston rod 35 through an adjustable connection 36. This connection consists of a threaded opening in the end of the rack into which the threaded end of the piston rod extends in threaded engagement. A check nut 37 secures the rod to the rack in any adjusted position. The piston rod 35 extends into a cylinder 38 and the end thereof, within the cylinder, is secured to a piston 39. Suitable ports are provided at each end of the cylinder for the admission and exhaust of fluid under pressure which may be controlled manually or automatically in timed relation with respect to the operation of the plunger 4.

In operation, plastic material is injected into the mold cavity 19 as hereinbefore described while the dies are closed, that is while the movable die 20 is in abutting relation or pressure contact with the stationary die 17. In this position of the dies, the core 22 extends into the mold cavity and the plastic material forms about the core. A screw cap is thus molded in the mold cavity.

Upon the molding of the screw cap and after enough time for the plastic material to solidify sufficiently to retain its shape, air under pressure is admitted to the upper end of the cylinder 38. Downward movement of the rack is thus effected with consequent rotation of the core rod 21. Engagement of the threads 30 and 31 effect a withdrawal of the core rod, movement to the left as seen in Fig. 2, which causes opening movement of the platten 24 and the die 20. Due to the threaded engagement of the thread 27 on the core rod 21 and the movable platten 24, movement of the platten is effected at a different rate than the movement of the core, but in the same direction. The relation of the threads 31, 27 and 18 are such that as the movable die moves away from the stationary die, the core is gradually withdrawn into the movable die, but at such a rate that the edge of the molded cap is maintained in frictional contact with the surface of the movable die 20 until the cap is entirely withdrawn from the mold cavity and the core is withdrawn from the cap. On withdrawal of the cap, the sprue is broken at the surface of the cap and when the dies are fully open and the cap released from the core, the cap falls into the receiving chute 23. By admitting air to the lower end of the cylinder 38 and opening the upper end to exhaust, the rack is moved upwardly and the die 20 and core 22 are returned to molding position and the cycle is repeated.

For a cap having six threads to the inch and having a depth of thread of one inch, a travel of one-half inch releases the core. This is effected by three revolutions of the core rod. In molding such a cap it has been found that the desirable relation of the pinion, rack and threads 31 and 27 are as follows: Pinion—outside diameter one and three-quarter inches, pitch diameter one and one-half inches, pitch eight and twelve teeth; rack—eight pitch and a travel of fourteen and one thousand three hundred and seventy-two ten thousandths inches; square thread 31—two and one-half inch outside diameter, two plus inches root diameter and two threads to the inch; thread 27—six threads to the inch. With this relation, in three revolutions of the core rod, the core rod moves one and one-half inches, and the platten and movable die move one inch.

The sprue opening 18 is considerably less in diameter and shorter than normally used such that the sprue that adheres to the molded cap need not be removed and remains so that no further operations are required. The cap thus leaves the machine as a finished product. To this end, the sprue opening is such that, the sprue adhering to the molded cap is desirably three thousandths of an inch in length but may be as much as twenty thousandths of an inch.

It will be obvious that liquid under pressure as well as air may be used in the cylinders 5 and 38 for actuating the pistons 11 and 39 respectively.

From the foregoing description of the embodiment of the invention illustrated in the drawing, it will be seen that by this invention, there is provided a machine in which articles having a thread thereon may be molded and the thread forming element withdrawn without distorting the thread; in which the molded article is automatically removed and released from the dies by the action of withdrawing the thread forming element; in which it is unnecessary for an operator to place his hand or fingers between the dies; and in which articles of the kind mentioned may be formed in rapid succession.

It will be obvious that various changes may be made by those skilled in the art in the embodiment of the invention illustrated in the drawing and described in detail above within the principle and scope of the invention as expressed in the appended claims.

I claim:

1. In a machine of the kind described, the combination comprising a stationary die having a mold cavity therein and a sprue opening to the cavity for the injection of thermo-plastic material into the mold cavity, a movable die movable into contact with and away from the stationary die, a rotatably and longitudinally mounted core movable into and out of the mold cavity and having a thread on the portion thereof which extends into the mold cavity, said core including a rod extending through said movable die and having a thread adjacent the end thereof, a stationary element having an internal thread therein in engagement with the thread adjacent the end of the rod, means for rotating the rod, and cooperating threads on the rod and movable die for effecting movement of the movable die upon rotation of the rod, the threads on the stationary element, core rod and movable die being related to the thread of the core to effect a withdrawal of the molded article from the mold cavity upon movement of the movable die and to retain the molded article in contact with the movable die during the withdrawal of the core therefrom.

2. In a machine of the kind described, the combination comprising a stationary die having a mold cavity therein and a sprue opening to the mold cavity, a movable die movable into contact with and away from the stationary die and having a flat surface for closing the mold cavity in the stationary die and an opening therethrough for a core, a core rod extending through the opening in the movable die and rotatably and slidably mounted therein, a threaded core on the end of the core rod arranged to extend into the mold cavity of the stationary die in the closed position of the movable die, means for moving the movable die away from said stationary die and said threaded core out of the mold cavity of the stationary die, including mating threads on the core rod and the movable die, additional mating threads on the core rod and a stationary bracket, and means for rotating the core rod, the several threads being related and related to the core thread that a molded article is retained in frictional engagement with the movable die during withdrawal from the mold cavity and the unscrewing of the core.

WILLIAM M. LESTER.

REFERENCES CITED

The following references are of record in the file of this patent:

UNITED STATES PATENTS

| Number | Name | Date |
|---|---|---|
| 1,959,612 | Burke | May 22, 1934 |
| 2,197,968 | De Mattia | Apr. 23, 1940 |
| 2,227,263 | Knowles | Dec. 31, 1940 |
| 2,295,220 | Kaula | Sept 8, 1942 |
| 2,317,823 | Strauss | Apr. 27, 1943 |
| 2,322,908 | Poux | June 29, 1943 |
| 2,331,702 | Kopitke | Oct. 12, 1943 |
| 2,363,808 | Sayre | Nov. 28, 1944 |

FOREIGN PATENTS

| Number | Country | Date |
|---|---|---|
| 696,643 | Germany | Sept. 26, 1940 |